US010956453B2

(12) United States Patent
    Goeser

(10) Patent No.: US 10,956,453 B2
(45) Date of Patent: Mar. 23, 2021

(54) METHOD TO ESTIMATE THE DELETABILITY OF DATA OBJECTS

(71) Applicant: INTERNATIONAL BUSINESS MACHINES CORPORATION, Armonk, NY (US)

(72) Inventor: Sebastian Goeser, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 15/603,725

(22) Filed: May 24, 2017

(65) Prior Publication Data
    US 2018/0341695 A1     Nov. 29, 2018

(51) Int. Cl.
    *G06F 16/28*     (2019.01)
    *G06F 16/23*     (2019.01)

(52) U.S. Cl.
    CPC ........ *G06F 16/285* (2019.01); *G06F 16/2365* (2019.01)

(58) Field of Classification Search
    USPC ........................................................ 707/687
    See application file for complete search history.

(56) References Cited

U.S. PATENT DOCUMENTS

| 6,195,657 B1 | 2/2001 | Rucker et al. |
| 6,587,876 B1 | 7/2003 | Mahon et al. |
| 7,188,116 B2 | 3/2007 | Cheng |
| 7,418,489 B2 | 8/2008 | Sanghvi et al. |
| 7,587,418 B2 | 9/2009 | Hsu |
| 7,743,058 B2 | 6/2010 | Liu et al. |

(Continued)

FOREIGN PATENT DOCUMENTS

| CN | 101420313 A | 4/2009 |
| CN | 101997853 A | 3/2011 |

(Continued)

OTHER PUBLICATIONS

Anonymous, "Smarter Information Lifecycle Management," An IP.com Prior Art Database Technical Disclosure, May 27, 2011, p. 1-7, IP.com No. 000207370.

(Continued)

*Primary Examiner* — Tamara T Kyle
*Assistant Examiner* — Raheem Hoffler
(74) *Attorney, Agent, or Firm* — L. Jeffrey Kelly

(57) ABSTRACT

A method, computer system, and a computer program product for processing a set of data objects of one or more users stored in a computer system is provided. The present invention may include providing data object properties and user properties of the set of data objects. The present invention may include determining a combined property of the data object properties and user properties. The present invention may include determining time dependent properties and at least two metrics, wherein a first metric indicates the deletability of a cluster and a second metric indicates the quality of the cluster, and wherein the first metric is determined using time dependent properties of the cluster. The present invention may include inputting the set of combined properties to a clustering algorithm and using the clustering algorithm to cluster the data objects to identify a best deletable cluster to determine if a data object is deletable.

20 Claims, 4 Drawing Sheets

(56) References Cited

U.S. PATENT DOCUMENTS

| | | | |
|---|---|---|---|
| 7,970,746 | B2 | 6/2011 | Seshadri et al. |
| 8,023,751 | B1* | 9/2011 | Reisman .............. G11B 27/034 |
| | | | 382/232 |
| 8,145,677 | B2 | 3/2012 | Al-Shameri |
| 9,227,140 | B2* | 1/2016 | Muller .................... A63F 13/45 |
| 2010/0011027 | A1 | 1/2010 | Cox et al. |
| 2011/0106771 | A1 | 5/2011 | McDonald et al. |
| 2013/0030865 | A1 | 1/2013 | Villaverde et al. |
| 2014/0143407 | A1* | 5/2014 | Zhang .................. H04L 41/145 |
| | | | 709/224 |
| 2015/0199386 | A1* | 7/2015 | Stokes ............... G06K 9/00483 |
| | | | 707/749 |
| 2015/0356087 | A1* | 12/2015 | Alvino ................... G06Q 30/02 |
| | | | 707/728 |
| 2016/0004730 | A1 | 1/2016 | Goeser |
| 2016/0045120 | A1* | 2/2016 | Friedman ........... A61B 5/04001 |
| | | | 600/544 |
| 2016/0239857 | A1* | 8/2016 | Milton .................. H04W 4/029 |
| 2016/0366565 | A1* | 12/2016 | Fjelberg .................. H04W 4/08 |
| 2017/0124176 | A1* | 5/2017 | Beznos ................ G06Q 20/102 |
| 2017/0270122 | A1* | 9/2017 | He .................... G06F 16/24578 |
| 2018/0040085 | A1* | 2/2018 | Tal-Botzer ............... G09B 7/02 |

FOREIGN PATENT DOCUMENTS

| | | |
|---|---|---|
| CN | 105488167 A | 4/2016 |
| CN | 105912456 A | 8/2016 |
| CN | 110679114 A | 1/2020 |
| DE | 112018001290 T5 | 1/2020 |
| GB | 2528047 A | 1/2016 |
| GB | 2576453 A | 1/2020 |
| JP | 2014021552 A | 2/2014 |
| WO | 2006021840 A1 | 3/2006 |
| WO | 2018215912 A1 | 11/2018 |

OTHER PUBLICATIONS

Börzsönyi et al., "The Skyline Operator," 17th International Conference on Data Engineering, 2001, p. 421-430, IEEE.

CGOC, "Information Governance Benchmark Report in Global 1000 Companies," CGOC The Council Report, Oct. 2010, p. 1-26.

Geerts et al., "Policy-Level Specifications in REA Enterprise Information Systems," Journal of Information Systems, Fall 2006, p. 37-63, vol. 20, No. 2.

IBM, "Atlas eDiscovery Process Management," IBM Software, p. 1-3, http://www-03.ibm.com/software/products/en/atlasediscoveryprocmgmt/, Accessed on May 24, 2017.

IBM, "IBM Data Governance," IBM Analytics, p. 1-6, https://www.ibm.com/analytics/us/en/technology/data-governance/, Accessed on May 16, 2017.

IBM, "IBM StoredIQ Administrator Administration Guide," IBM StoredIQ 7.6.0.4 Technical Documentation, 2015, p. 1-62, IBM Corporation.

IBM, "IBM StoredIQ Platform Overview Guide," IBM StoredIQ 7.6.0.4 Technical Documentation, 2015, p. 1-14, IBM Corporation.

IBM, "A Method for Effective Storing of Preservation Objects in an Enterprise Content Management (ECM) System," An IP.com Prior Art Database Technical Disclosure, Sep. 22, 2009, p. 1-5, IP.com No. 000188067.

Kasper et al., "A Logical Semantics for Feature Structures," Proceedings of the 24th Annual Meeting on Association for Computational Linguistics (ACL '86), 1986, p. 257-266.

Veritas, "Information Governance: Empower Decision-Making with Information Insight," Veritas Solution Brochure, 2016, p. 1-16, Veritas Technologies LLC.

Wikipedia, "Multi-Objective Optimization," Wikipedia: the Free Encyclopedia, Last Modified on May 5, 2017, p. 1-16, https://en.wikipedia.org/wiki/Multi-objective_optimization, Accessed on May 16, 2017.

Wu, "Probabilistic Unification-Based Integration of Syntactic and Semantic Preferences for Nominal Compounds," Proceedings of the 13th Conference on Computational Linguistics (COLING '90), 1990, p. 413-418.

Zadrozny, "Policy Mining: Learning Decision Policies from Fixed Sets of Data," University of California Ph.D. Thesis, 2003, p. 1-143, San Diego, California.

Zhu et al., "Metadata Management with IBM InfoSphere Information Server," IBM Redbooks, Oct. 2011, p. 1-434, First Edition, IBM Information Management Software.

International Search Report and The Written Opinion of the International Searching Authority, dated Sep. 19, 2018, International application No. PCT/IB2018/053569, International filing date May 21, 2018.

Intellectual Property Office, Patents Act 1977: Examination Report under Section 18(3), Application No. GB1916870.7, Reference: DE920170043GB01, dated May 13, 2020, 3 pages.

Intellectual Property Office, Patents Act 1977: Examination Report under Section 18(3), Application No. GB1916870.7, Reference: DE920170043GB01, dated Jan. 2, 2020, 7 pages.

\* cited by examiner

METHOD TO ESTIMATE THE DELETABILITY OF DATA OBJECTS

BACKGROUND

The present invention relates to the field of digital computer systems, and more specifically, to a method of processing a set of data objects of one or more users.

Companies accumulate enormous amounts of data objects. Disposing of those objects which are no longer relevant for business, legal, or any other important purposes in a justified, explainable way is desirable. Alternatively, data objects for a local usage community, such as certain legal documents, may be preserved. The majority of commonly accessible documents in today's enterprises are subject to a more or less rigid top-down retention scheme, such as the execution, control, and evaluation of which typically requires significant human and infrastructure resources.

SUMMARY

Embodiments of the present invention disclose a method, computer system, and a computer program product for processing a set of data objects of one or more users stored in a computer system. The present invention may include providing data object properties of the set of data objects and user properties of the users of the set of data objects. The present invention may also include determining for each data object of the set of data objects a combined property comprising at least part of the data object properties of the data object and user properties of users of the data object. The present invention may then include determining time dependent properties of the set of data objects, where a time dependent property of a data object comprises data object and user properties of the data object having time values. The present invention may further include defining at least two metrics, where a first metric of the metrics indicates the deletability of a cluster of data objects and a second metric indicates the quality of the cluster, where the first metric is determined using the time dependent properties of the data objects of the cluster. The present invention may also include inputting at least part of the set of combined properties to a clustering algorithm. The present invention may then include using the clustering algorithm to cluster the data objects based and to identify a best deletable cluster of the data objects based on the values of the metrics; using the best deletable cluster for determining if a data object of the set of data objects is deletable or not deletable.

Various embodiments provide a method of processing a set of data objects of one or more users, computer system and computer program product as described by the subject matter of the independent claims. Advantageous embodiments are described in the dependent claims. Embodiments of the present invention can be freely combined with each other if they are not mutually exclusive. In one aspect, the invention relates to a method of processing a set of data objects of one or more users stored in a computer system. In another aspect, the invention relates to a computer program product comprising a computer-readable storage medium having computer-readable program code embodied therewith, the computer-readable program code configured to implement all of steps of the method according to preceding embodiments. In another aspect, the invention relates to a computer system of processing a set of data objects of one or more users stored in the computer system.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The following embodiments of the invention are explained in greater detail, by way of example, making reference to the drawings in which.

DETAILED DESCRIPTION

Figure 1:
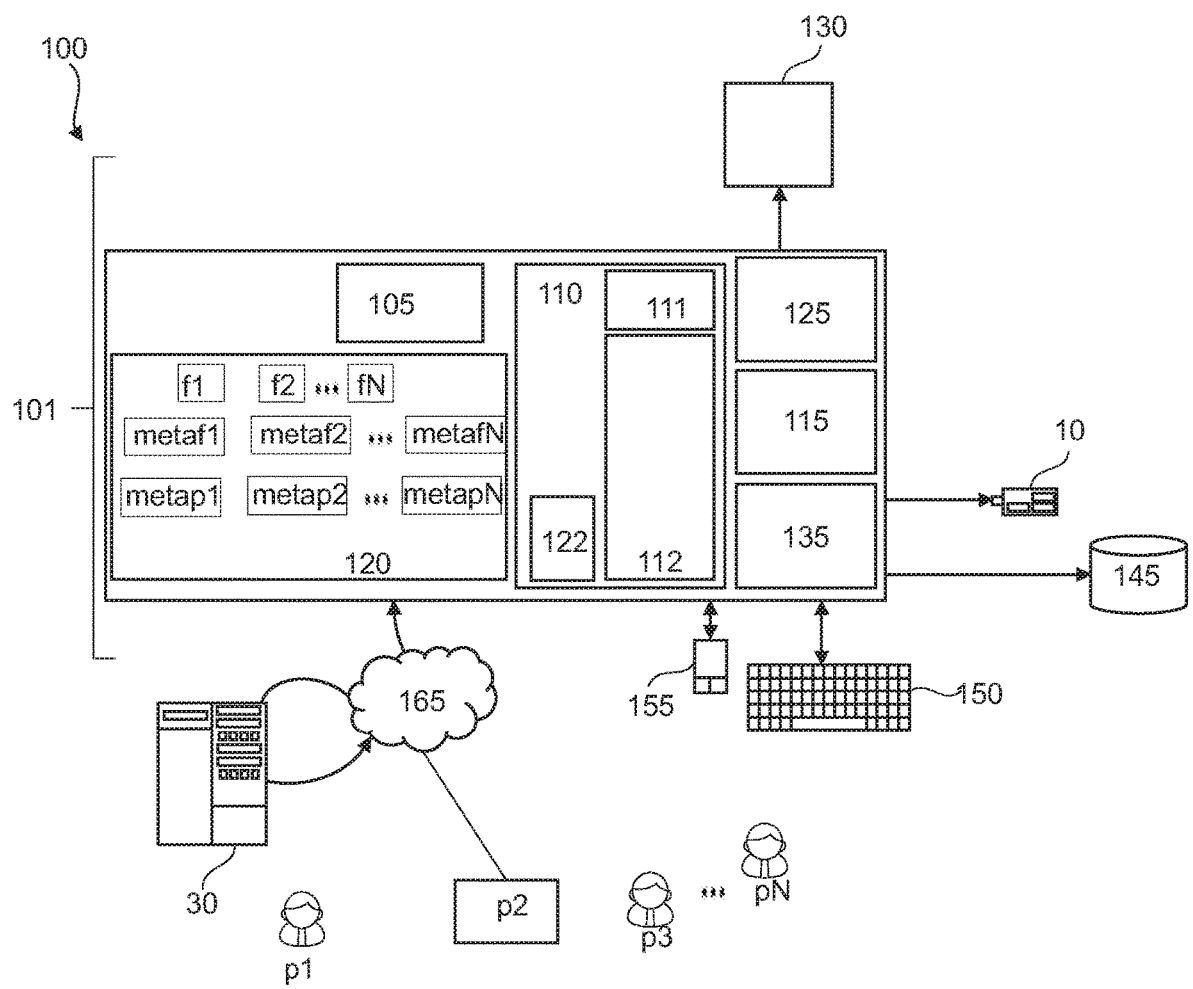
FIG. 1 illustrates a computerized system, suited for implementing one or more method steps as involved in the present disclosure.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term "user" refers to an entity e.g., an individual, a computer, a project or an application executing on a computer. The user may be defined by one or more attributes indicating the user properties of the user. The user property of a user may, for example, be the start time and the end time of the project or the start time and the end time of the user's account in the computer system. The start time and end time of the project may for example be defined per data object of the project such that the start time and end time of the project with regard to a given data object is the start time and end time of a user participating to the project and owns the given object. For example, if the user leaves the project, the data object is no longer belonging to the project, thus the end time is the time the user left the project and the start time is the time at which the user started the project).

The second metric also referred to as a quality metric, may be a metric descriptive of the number of property values and data objects of a cluster. The second metric may, for example, be descriptive or defined using the number of distinct property values or the number of different classes of the property values. A class of property values of a given property may, for example, be defined by splitting the range of the property values into intervals, wherein the class corresponds to an interval (e.g., if the property is the age, the classes may include a middle age class). For example, the second metric may be defined such that the higher the second metric for a given cluster is, the quality of that cluster is smaller. Alternatively, the lower the second metric is for a given cluster the higher the quality is of the given cluster. The quality metric is used as a means for generalization to the entire information available for all data objects. For example, the second metric may be combination of the sparseness of object property values with the number of data objects it applies. The second metric may be defined, for example, such that the higher the second metric's value is, the quality of the cluster is smaller. For example, the quality metric of a given cluster may be the number of distinct attribute values or property values of the data objects of the given cluster divided by the number of data objects in the given cluster. In another example, the quality metric of a given cluster may be the number of classes of attribute values of the data objects of the given cluster divided by the number of data objects in the given cluster. For example, the higher that ratio for a cluster is, the quality of the cluster is smaller. The quality metric may be defined using the number of data objects and the description of a given cluster. The first metrics or the second metrics may, for example, be normalized (e.g., between 0 and 1). Additionally, a vector of the set of vectors may, for example, be an array such as a one-dimensional array.

The data object property ("object property") of a data object may include values indicative or descriptive of the data object. The user property of a user may include values indicative or descriptive of the user. In one example, the data object properties of a given data object may include one or more properties which are user defined (e.g., the one or more properties are received by the computer system as inputs). In one other example, the user properties of a given user may include one or more properties which are user defined (e.g., the one or more properties of the given user are received by the computer system as inputs).

The clustering algorithm, compared to the pseudo code of the clustering algorithm below, is configured to form clusters using the Euclidian distance between data objects or between clusters and to rank the clusters based on the values of the metrics to find the best deletable cluster. The clustering algorithm may involve a statistical data analysis such as machine learning and pattern recognition. The clustering algorithm may use a machine learning technique. The machine learning technique may be configured to identify an optimal outcome (e.g., a deletable cluster) by observing the values of the metrics. The machine learning techniques may use file metadata, storage data or organization data, where the latter describe the governance context of a data object. The clustering algorithm may be formulated as a multi-objective optimization problem involving at least two objective functions for the two metrics to be optimized simultaneously. For example, the objectives may be to maximize the two metrics (e.g., maximize the deletability and maximize the quality of the cluster).

The clustering algorithm may provide an estimation function for the likelihood that a data object is deletable or needs to be preserved. This function may be referred to as a preservability function. The present method may be inherently probabilistic as it provides an estimate for the likelihood that a data object should be preserved or deleted. A minimization of the error probability inherent to each such estimate may be achieved through using very large learning samples (e.g., part of the vector set). The preservability may depend on policy governance, where a policy is a deontic object of which the application aims, in a top-down fashion, at moving target objects into a certain state with sanctions being in place for failure to move target objects into a certain state. In contrast to looking at the execution path of policies in a top-down fashion, the present method may look at which low-level governance objects do exist in a company and how they relate to the higher level policies. Preservability computation follows a bottom-up approach. With the present method the preservability may be defined not over the best preservable cluster, but over a cluster which fits both preservability and cluster quality. The preservability model may accommodate data in the range of hundreds of millions of data objects.

The first metric is determined using at least the time dependent properties of the data objects of the cluster. For example, the first metric may be determined using the time dependent properties of the data objects of the cluster and other properties such as the degree of ownership property.

The present method may have the advantage of providing a reliable and robust method for the deletion of data objects based on accurate criteria involving both the data objects as well as the users of the data objects. The method may compute a probable deletion function through testing data based on probability computations by creating file vectors for the union of training and test data. This may provide the optimal set of data objects to be deleted and may thus avoid deleting data objects that are still usable or still needed.

According to one embodiment, the method further includes generating a set of vectors comprising of the respective combined properties, wherein inputting at least part of the set of combined properties to a clustering algorithm includes inputting at least part of the set of vectors to the clustering algorithm. The first metric of a given cluster is a combination of object metrics of data objects of the cluster, wherein an object metric indicates the deletability of the respective data object. This embodiment may provide an accurate cluster metric which may result in a more optimal set of data objects to be deleted.

The object metric of a given data object includes a weighted sum of the activeness of users of the given data object multiplied by the activeness of the given data object. The activeness of the user is determined based on the result of comparing the current time to the start time and the end time associated to the user. The activeness of the given data object is determined based on the result of comparing the last modification time or creation date of the given data object to the start time and the end time associated to a user of the given data object. This embodiment may provide an efficient combination of user and object properties for defining the metrics.

The sum is over users of the users having a predefined degree of ownership of the given data object higher than a predefined threshold. This may further optimize the identification of the set of data objects to be deleted. The degree of ownership may, for example, be the permission or level of access of a user to a data object. This may, for example, be indicated in the access control list (ACL) of the data object.

The first metric is the mean of the object metrics of the data objects of a cluster. In another example, the first metric includes the sum of the object metrics of the data objects of a cluster. In another example, the first metric may be based on the recency of objects or age of objects. The first metric may for example be a normalized value (e.g., in the range [0, 1]).

The second metric may be indicative of the number of data objects and the number of property values of the data objects of a cluster. The number of property values may be the number of values of different properties. The second metric may be indicative of the sparseness of data object properties with the number of data objects it applies. If, for example, data objects have properties or attributes, such as age or department, the distinct property values may include distinct values of age or department.

The user property may include a degree of ownership of the user to a file and the start time and end time associated with the user. The degree of ownership of the user to a file may include the right access level of the user to the file (e.g., administrator user or read only user). The start time and the end time associated with the user may for example be the start time and the end time of the user being a project. The object property of a data object may include, for example, a creation date of the data object, a last modification time of the data object, the size of the data object, the type of the data object, the file system embedding the data object, an indication of the data object being binary or not, or a location storage of the data object.

The clustering algorithm is a hierarchical clustering algorithm, wherein the best deletable cluster is the Pareto-optimal cluster under the metrics. Using the hierarchical clustering algorithm there may be no need for apriori information about the number of clusters required.

The method further includes using the best deletable cluster for determining if a data object of another set of data objects is deletable or not deletable. For example, each data object of the set of data objects may be compared to the best deletable cluster by calculating the distance between the data object and a selected point of the best deletable cluster. The selected point may, for example, be the centroid of the best deletable cluster.

Another set of data objects may be stored in a different computer system. The other set of data objects belongs to one or more users. These embodiments may particularly be advantageous in case of databases comprising the same type of data. At least one part of the vectors may be randomly selected from the set of vectors. This may avoid a bias in the identification of the best deletable cluster. The best deletable cluster may be the cluster having a pair of values of the first and second metrics that fulfill both the objective of high deletability and high quality. The pair of values of the first and second metrics may be obtained if none of the objectives can be improved in value without degrading the other objective values. The solution comprising that pair may be Pareto optimal or Pareto efficient.

The best deletable cluster may be the cluster having the highest value of the first metric and the highest value of the second metric among clusters defined by the clustering algorithm. In other terms, the highest possible combination of deletablity and quality may be obtained, with deletability outweighing the quality.

FIG. 1 represents a general computerized system, suited for implementing method steps as involved in the disclosure.

It will be appreciated that the methods described herein are at least partly non-interactive, and automated by way of computerized systems, such as servers or embedded systems. In exemplary embodiments, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are coupled through communication via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM)). Note that the memory 110 can have a distributed architecture, where various components are situated remote from one another, but can be accessed by the processor 105.

The software in memory 110 may include one or more separate programs, each of which may include an ordered listing of executable instructions for implementing logical functions, notably functions involved in embodiments of this invention. In the example of FIG. 1, software in the memory 110 includes instructions or software 112 e.g., instructions to manage databases such as a database management system.

The software in memory 110 shall also typically include a suitable operating system (OS) 111. The OS 111 essentially controls the execution of other computer programs, such as possibly software 112 for implementing methods as described herein.

The methods described herein may be in the form of a source program or software 112, executable program or software 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may include a disk storage such as HDD storage.

The system 100 may be associated to one more users p1-pN. The term user may refer to an entity, such as, an individual, a computer, a project or an application executing on a computer. In one example, the system 100 may be connected to user p2 via network 165. User p2 may, for example, be a computer or a computer application. In another example, a user such as p1 may be an individual having an account in the system 100.

The storage 120 may include data objects f1-fN of the users p1-pN. A data object may for example be a file or at least part of a database. For example, the user p2 may be assigned one or more data objects of f1-fN to which for example p2 has access or p2 reads for processing an application etc. In another example, a data object f1-fN such as a book may belong to a user p1. In other terms, the data objects f1-fN have a relation or link to the users p1-pN.

The storage 120 may further include meta data descriptive (e.g., descriptive of the properties) of the data objects f1-fN and the data objects p1-pN. For example, meta data metaf1-metafN are meta data of the respective data objects f1-fN. Meta data metap1-metapN are meta data of the respective users p1-pN.

A meta data metaf1-fN may include one or more object attributes Attf1_1-Attf1_N, Attf2_1-Attf2_N . . . AttfN_1-AttfN_N, values of which describe properties of the data object f1-fN respectively. For example, an object attribute may include a creation date, file format, or a level of confidentiality of the respective data object. In other terms, each object attribute of a meta data metaf1-metafN has a value describing a data object property of the respective data object f1-fN. Each data object (e.g., f1) has at least one attribute of the attributes Attf1_1-Attf1_N which is time related or time dependent. Assuming, for exemplification purpose, the attributes Attf1_1 and Attf1_3 of f1 are time dependent as Attf1_1 is the creation date of f1 and Attf1_3 is the last modification time of data object f1. Data objects f1-fN may or may not have the same object attributes in their respective meta data metaf1-metafN.

A meta data metap1-pN may include one or more user attributes Attp1_1-Attp1_N, Attp2_1-Attp2_N . . . AttpN_1-AttpN_N, values of which describe user properties of the user p1-pN respectively. The user property may include a property of the user itself or a property describing the relation of the user to one or more data objects f1-fN. For example, a user property may indicate that the user is the owner of one or more data objects f1-fN. In other terms, each user attribute of a meta data metap1-metapN has a value describing a user property of the respective user. For example, users p1 and p3 may both refer to data object f1 as p1 and p3 are owners of the data object f1. Thus, the meta data metap1 and metap3 may each include an attribute (e.g., "owner of") having value "f1" (e.g., Attp1_1="owner of and Attp3_1="owner of"). Each user has at least one attribute of the user attributes Attp1_1-AttpN_N which is time related or time dependent. For example, a user attribute "FromDate" may indicate the starting date of a project (e.g., pN) and another user attribute "ToDate" may indicate the end time of the project pN. For example, the users p1 and p3 have their respective meta data metap1 and metap3 comprising the attributes "FromDate" and "ToDate" (e.g., Attp1 2="FromDate" and Attp1_3="ToDate" and Attp3_2="FromDate" and Attp3_3="ToDate"). Users p1-pN may or may not have the same user attributes in their respective meta data metap1-metapN.

In one example, the attributes of data objects f1-fN and users p1-pN may be configured (e.g., using a tag) such that each attribute is indicative of whether it corresponds to a time dependent property.

Figure 2:
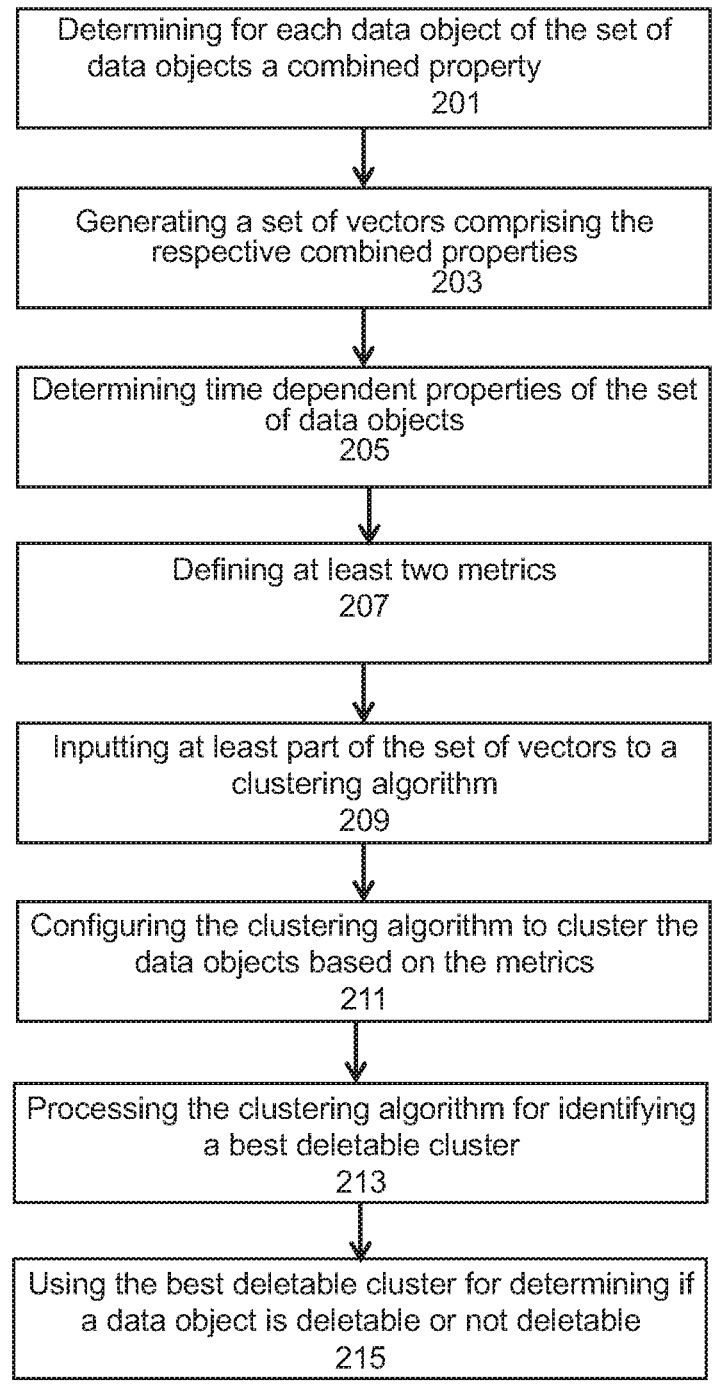
FIG. 2 is a flowchart of a method of processing a set of data objects of one or more users according to at least one embodiment.

FIG. 2 is a flowchart of a method of processing a set of data objects (f1-fN) of one or more users (p1-pN) stored in a computer system 100. The method may be used to clean up a storage system (e.g., storage 120) by deleting the data objects that are identified by the present method as deletable.

As illustrated in FIG. 1, each data object f1-fN is associated with respective meta data mataf1-metafN comprising the data object properties of the data object. Furthermore, each user p1-pN is associated with meta data metap1-metapN comprising user properties of the users p1-pN.

In step 201, a combined property may be determined for each data object of the set of data objects f1-fN. The combined property of a given data object includes at least part of the data object properties of the given data object and the user properties of the users of the given data object. For example, the combined property of data object f1 may include the meta data metaf1 of f1 and metap1 and metap3 as the users p1 and p3 are the owners of f1 (cf. FIG. 1). In other terms, the combined property of the given data object f1 may comprise values of the object attributes (Attf1_1-Attf1_N) of meta data metaf1 and values of the user attributes (Attp1_1-N and Attp3_1-N) of meta data metap1 and metap3 that refers to f1.

In step 203, a set of vectors may be generated such that each vector comprises the respective combined properties. For example, for each data object f1-fN a respective vector may be created or generated. The vector of a given data object f1 may, for example, be a multidimensional vector having a dimension for each attribute of the object and user attributes of the combined property of the given data object f1.

In step 205, time dependent properties of the set of data objects may be determined or identified. For example, for each combined property data object and user properties of that combined property that have a time value or time related value may be identified.

Following the example of data object f1, the combined property includes attributes Attf1_1-N, Attp1_1-N and Attp3_1-N. Each of the attribute Attf1_1-N, Attp1_1-N and Attp3_1-N may be checked to determine if it has a time value or if it corresponds to time dependent property (e.g., using the types associated with the attributes). For the data object f1, the attributes Attf1_1 and Attf1_3, Attp1_2, Attp1_3, Attp3_2 and Attp3_3 may be identified as they correspond to time dependent properties.

In step 207 at least two metrics may be determined or defined. A first metric of the metrics may indicate the deletability of a cluster of data objects and a second metric of the metrics may indicate the quality of the cluster. The first metric of a given cluster may be determined using at least the time dependent properties of the data objects of the given cluster. The second metric may provide a quality measure so that the clustering process can be optimized against this measure.

For example, the deletability metric may be defined such that it indicates how active a given data object is based on both the time dependent object properties of the data object and time dependent user properties of the users that refer to data object f, or more specifically, the owners of data object f. The activeness of users p that have access to data object f may be determined, for example, as a deletion variable referred to as aprioriDel(p) for a user p of those users indicating that user p and all its content is considered deletable may be defined. For example, the aprioriDel(p) may be set by the user p to a given value indicating that the content of p is deletable. Using the deletion variable of the user p and the attributes associated with the user p which are time dependent such as FromDate(p) and ToDate(p) the activeness of the user p (referred to as projectActiveness(p)) may be calculated as follows:

projectActiveness($p$)=0 if aprioriDel($p$)

3 if NOW after FromDate(p) & NOW before ToDate(p)

2 if NOW after ToDate(p)

1 if NOW before FromDate(p)

0 otherwise, where NOW is the current time.

The current time may be the time at which the present method is executed. The activeness of each data object f with regard to a corresponding user p, referred to as fileActiveness(f,p)) may be determined by a variable recent(f) indicating whether the data object f is recent or not may be defined. The variable recent (f) may be defined based on the age of the data object f which may be defined as follows |NOW−date(f)| or as log|NOW−date(f)|, where date(f) is the creation date of the data object f. If |NOW−date(f)| is smaller than a predefined threshold, the variable recent(f) may have a value (e.g., 1) indicating that the data object f is recent, otherwise the variable recent(f) may have a value (e.g., 0) indicating that the data object f is not recent. The activeness of the data object f with regard to a given user p (fileActiveness(f,p)) may be calculated as follows using the variable recent(f), the creation date of f and time dependent attributes of the user p, namely ToDate and FromDate fileActiveness($f,p$)=SUM_$i$[dateFactors_$i(f,p)$] with dateFactors_1($f,p$)=2 if date($f$)<ToDate($p$)

dateFactors_2($f,p$)=2 if date($f$)>Fromdate($p$)

dateFactors_3($f,p$)=1 if recent($f$).

Using the calculated activeness of users p that have access to data object f and the activeness of the data object f fileActiveness(f,p) with respect to each of those users p, the combined activeness (combactive) may be defined as a weighted sum as follows:

combactive($f$)=SUM_{$p$}(projectActiveness($p$)*fileActiveness($f,p$)), with the sum is over users that have access to the data object $f$.

An object metric (specDel(f)) of the data object f may then be defined using the combined activeness combactive (f) as follows: specDel(f)=1 if combactive(f)=0 or 1/combactive(f) otherwise.

Using the object metrics of the data objects belonging to a cluster c, the first metric (specDel(c)) of the cluster c may be calculated for example as the mean of the object metrics: specDel(c)=MEAN[specDel(f)]f∈c. ("f∈c" refers to data objects f belonging to the cluster c).

In another example, the above sum SUM_{p} may be performed over part of the users that have access to the data object f. This part of users may be selected, for example, based on the degree of ownership of each user p to the data object f. This degree of ownership may be referred to as strengthOfOwnership(f, p) and may be defined as the sum of ownership indicators of p in f. This may for example indicate the strongest owners of data object f. The ownership indicators include, for example, the first name or the last name of p within the filename of f, file system ownership, or project related indicators. The part of the users may be defined as the users having the strengthOfOwnership(f, p) higher than a predefined threshold t: P_t(f)={p∈p1-pN-|strengthOfOwnership(f, p)>t}.

In this case, the combined activeness of the data object f may be defined as a weighted sum as follows:

combactive($f$)=SUM_{$p∈P_t(f)$}(projectActiveness($p$)*fileActiveness($f,p$)).

In step 209, at least part of the set of vectors created in step 203 may be input to a clustering algorithm. The at least part of the set of vectors may be used as a training data set. The clustering algorithm may, for example, be a hierarchical clustering algorithm. The at least part of the set of vectors may, for example, be randomly selected from the set of vectors.

In step 211, the clustering algorithm may be configured to cluster the data objects and to identify a best deletable cluster based on the metrics determined in step 207. For example, the clustering algorithm described in US 2016/0004730 A1, which is incorporated herein by reference, may be used to build a hierarchical cluster structure based on the distance(c1,c2) function, which provides a (normalized) Euclidean distance between the vectors of the two clusters c1, c2. The first metric specDel(c) may be used as a specialization criterion for learning a probabilistic deletability estimation function del(f) and the second metric as a means for generalization to the entire information available for all digital objects. A good cluster is a cluster with a low value of the second metric (i.e., high quality) and a high deletability. The configuring of the clustering algorithm may comprise the integration of two criteria on the first metric and second metric into the learning/cluster building process to find a best deletable cluster such that its first and second metric values fulfill both the objective of high delectability and high quality. That is the first and second metric values of the best deletable cluster are the one obtained if none of the objectives can be improved in value without degrading the other objective values. The pair of the first and second metric values of the best deletable cluster may be Pareto optimal or Pareto efficient.

A pseudo-code of the clustering algorithm for clustering F files may for example be set as follows: the variable named dateDeletability(c) in the following pseudo-code is the first metric specDel(c).

```
v(F) - set of all file vectors,(e.g., determined as the set of vectors
above)
F_t subset F - training set , F - all files
v(F_t) subset v(F) randomly chosen
1.   Learning step.
(1)     Get random set v(F_t) from v(F)
(2)     Create set of initial clusters C1 . . . Ck
(3)     Perform Euclidean distance clustering starting with C1 to Ck,
        yielding clusters
        Ck+1, . . . ,Cm (tree structure). For each new cluster C_j,
        compute cvalue(C_j)
        and dateDeletability(C_j).
(4)     Find cluster C_r (1 <= r <= m) such that
        dateDeletability(C_r) * k0 + 1/cvalue(C_r) is maximal
        where k0 is a predefined constant
(5)     Define del(f) =_def 1 - distance(v(C_r), v(f))
2.   Classification step.
        For all files F_i:
        if del(F_i) > threshold,
           print(F_i)
``` k0 in the above algorithm may be chosen high enough so that dateDeletability( ) outweighs the effect of cvalue( ) in all practical cases. The best deletable cluster may be obtained by maximizing dateDeletability(C_r)*k0+1/cvalue(C_r). This may allow finding a best deletable cluster having a pair of dateDeletability( ) and cvalue( ) that is obtained if none of the objectives (e.g., increase deletability) can be improved in value without degrading the other objective (e.g., increase quality) values. In step 213, the clustering algorithm may be processed for identifying a best deletable cluster of data objects.

For example, the best deletable cluster may be identified using an optimization problem with 2 target values namely the values of the first and second metrics. In one example, a combination of the two values, like a slider, more weight to the second metric means the algorithm generalizes more and more weight to the first metric specDel(c) means the algorithm specializes on sample data. This optimization against several objectives or criteria may be a Pareto optimization. A Pareto optimal solution is a cluster with a certain value of the first metric and a certain value of the second metric such that every cluster with a higher value of the second metric has a lower value of the first metric, and vice versa, so that at least two solutions may be provided.

In step 215, the best deletable cluster may be used for determining if a data object of the set of data objects is deletable or not deletable. For example, the distance distance (v(f), v(c_0)) between the vector of a data object f and the centroid vector of the best deletable cluster called c_0 may indicate if the data object f is deletable or not. For example, if that distance is smaller than a maximum distance threshold the data object f is deletable. The centroid vector of the best deletable cluster is the vector obtained by combing (e.g., summing and averaging) the vectors the data objects of the best deletable cluster. The distance between the vectors may be a Euclidian distance.

For example, a probabilistic deletability estimation function del(f) may be used to estimate or determine if a data object f is deletable or not. In one example, def(f)=1−distance(v(f), v(c_0)). The term deletability refers to the likelihood that a data object f is deletable, and represent its estimation function through: del(f)→[0, . . . , 1]. del(f) estimates the underlying Bayesian probability P(f∈f1-fN-|Meta(d), Date(d), Org(d)) that f is deletable given metadata, usage data and organization data on data object f. The distance between two vectors may for example be a Euclidian distance that is calculated using the elements of a vector with the corresponding elements of another vector.

Figure 3:
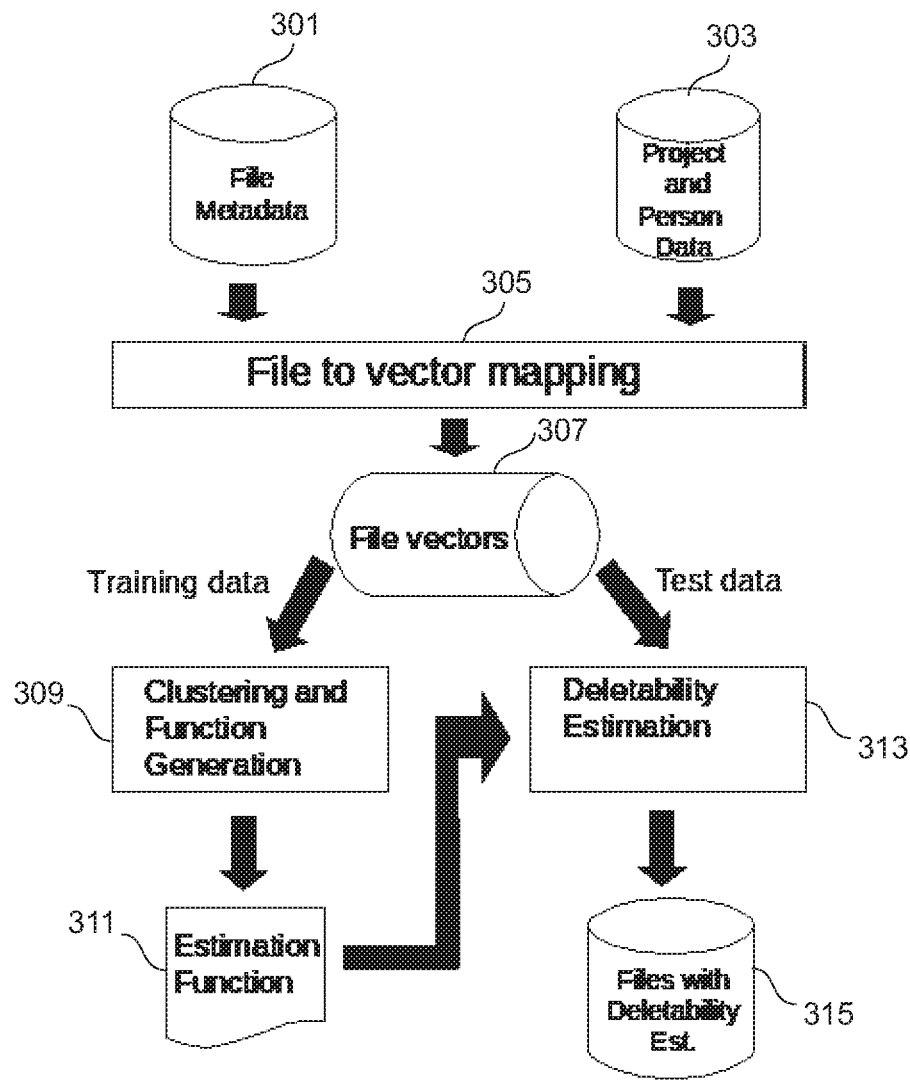
FIG. 3 is a flow diagram of an example method for estimating the deletability of predefined files according to at least one embodiment.

FIG. 3 is a flow diagram of an example method for estimating the deletability of predefined files.

As illustrated in FIG. 3, the test data and training data may be determined as follows. Using file metadata 301 (such as metaf1-metafN) and project and person data 303, a mapping 305 (e.g., as described with step 203 to identify the combined properties) may be performed to combine properties from the file metadata 301 and corresponding project and person data 303 into file vectors 307. The file metadata 301 as well as the project and person data 303 referring to a specific file may be conceptually represented in a single vector. This vector may also include more attributes such as the strongest owner of a file, based on a number of ownership indicators such as first name or last name within the filename, file system ownership, or project related indicators. The mapping 305 may result in that for each file, a corresponding file vector may be created.

The training data may be sampled randomly from the universe of file vectors 307. While training data can be in a range of 10M vectors, the deletability estimation may be at worst linear to the number of test data and may, therefore, be virtually unlimited. The training data may be input into the clustering algorithm 309. The clustering algorithm 309 may be configured to determine a probabilistic deletability function (del(f)) 311 through a first learning phase which uses the training data. The learning phase may be based on the first and second metrics. Furthermore, to obtain optimal values of the second metric, attribute values may be normalized during the mapping phase. Additionally, to distinguish the two criteria on the first and second metrics more clearly, a computation of the second metric may not use those (e.g., in this case, date related) attributes which may go into the computation of the object metric specDel(f).

For example, as an optimization for very large sets of training data in the first phase, initial sorting can be used to obtain initial clusters containing a multitude of file vectors. Once the best deletable cluster has been selected as the Pareto optimal cluster under the two criteria of the respective first and second metrics, a deletability function can be obtained at 311 using step 1.4 of the above pseudo-code algorithm.

In a second phase, the deletability function is being applied at 313 to test data from the same universe as the training data, wherein test data may include training data. The second phase results in predefined being associated with a deletability estimation at 315. Since both first and second phases are based on the same type of file vectors at 307, they are preceded by the mapping phase at 305 where the file vectors for the union of training and test data are being created.

Figure 4:
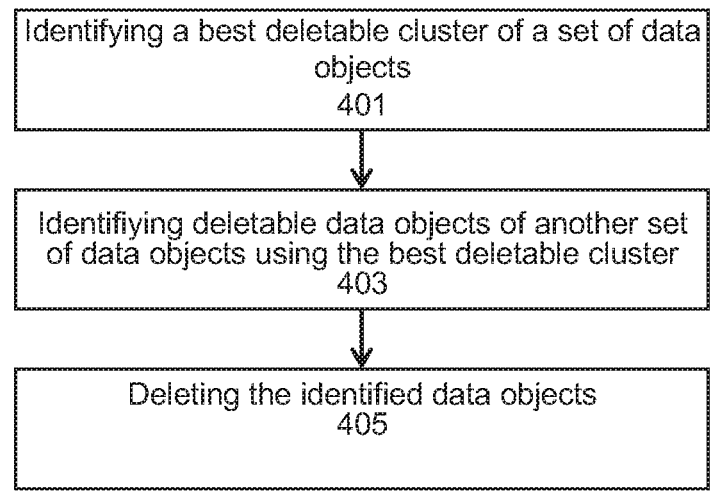
FIG. 4 is a flowchart of a method for deleting data objects according to at least one embodiment.

FIG. 4 is a flowchart of a method for cleaning a data storage of a production environment that may or may not be the computer system 100. In step 401, the best deletable cluster may be identified using the data objects f1-fN as described with reference to FIG. 2. In step 403, another set of data objects of the production environment may be processed to identify data objects of the other set of data objects to be deleted. A distance between each data object of the other set of data objects to the centroid of the best deletable cluster may be calculated and compared to a predefined threshold. At step 405, each data object of the other set of data objects having the distance smaller than the predefined threshold may be deleted. The deletion of the data objects comprises archiving the data objects in an archive storage for a predefined time period (e.g., 1 year) and delete the data objects after the end of the time period.

In another example, a method for retention policy mining is provided. The method includes defining a feature vector v for deletability or preservability, the feature vector contains, for example, owner, project, last access date, creation date and access rights. The method includes determining feature vectors for objects and defining a deletability metric for an object when the deletability metric may be dependent on time-related or date-related features of an object. The method includes determining delectability metric values for the objects, defining a cluster deletability metric specDel( ) dependent on delectability metric values of objects belonging to the cluster, defining a cluster quality metric cvalue( ) reflecting object features unrelated to time or date when using a hierarchical clustering algorithm (prior art) to determine a Pareto-optimal cluster under the cluster quality metric cvalue( ) (generalizing based on features unrelated to time or date) and the cluster deletability metric specDel( ) (specializing clustering on outdated objects), resulting in a best deletable cluster bdc. The method includes defining an estimation function del(f) for deletability of objects f based on the distance between the feature vector v(f) of an object and the feature vector v(bdc) of the centroid of the best deletable cluster. The estimation function del(f) is then used to classify objects to deletable/non-deletable.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for estimating the deletability of a set of data objects in a computer system, the method comprising:
   providing data object properties of the set of data objects and user properties of users of the set of data objects, wherein the data object properties contain data object attributes that describe the data object properties, wherein the user properties contain user attributes that describe the user properties;
   determining a combined property for each data object based on the data object properties and the user properties, wherein the combined property includes values for the data object attributes and values for the user attributes;
   generating a multidimensional vector for each data object that represents the combined property, wherein the multidimensional vector includes a dimension for each of the data object attributes and each of the user attributes;
   determining time dependent properties of the combined property for each of the data object attributes and each of the user attributes that contain a time value;
   defining a first metric that indicates a deletability of a cluster of data objects, wherein the first metric is determined using the time dependent properties and a deletion variable to determine an activeness of a user based on a plurality of time dependent user attributes associated with the user;
   defining a second metric that indicates the quality of the cluster, wherein the second metric is defined based on a number of property values and a number of data objects in a cluster;
   using a clustering algorithm to cluster the data objects and to identify a best deletable cluster of the data objects based on observation values of the first metric and the second metric, wherein the clustering algorithm ingests the combined properties and ranks a plurality of clusters, wherein the multidimensional vectors are used as a training dataset for machine learning, wherein the best deletable cluster is identified by using a specialization criterion for learning a probabilistic deletability estimation function for the first metric and a generalization of the total number of digital objects for the second metric; and
   using the best deletable cluster for determining if a data object of the set of data objects is deletable or not deletable, wherein determining if the data object of the set of data objects is deletable or not deletable includes comparing the set of data objects to the best deletable cluster by calculating the distance between the data object and a selected point of the best deletable cluster.

2. The method of claim 1, wherein the first metric of a given cluster is a combination of object metrics of data objects of the cluster, wherein an object metric indicates the deletability of the respective data object.

3. The method of claim 2, wherein the object metric of a given data object comprising a weighted sum of the activeness of users of the given data object multiplied by the activeness of the given data object, the activeness of the user is determined based on the result of comparing the current time to the start and end time associated to the user, the activeness of the given data object is determined based on the result of comparing the last modification time or creation date of the given data object to the start and end time associated to a user of the given data object.

4. The method of claim 2, wherein the first metric is the mean of the object metrics of the data objects of a cluster.

5. The method of claim 3, wherein the sum is over users of the users having a predefined degree of access to the given data object higher than a predefined threshold.

6. The method of claim 1, the second metric being indicative of the number of data objects and number of property values of the data objects of a cluster.

7. The method of claim 1, wherein the user properties related to the data objects include a degree of ownership of the user, a start time and an end time, wherein the degree of ownership includes access level rights of the user.

8. The method of claim 1, wherein the data object properties include a creation date of the data object, a last modification time of the data object, a type of the data object, a size of the data object, a file system embedding of the data object and a location storage of the data object.

9. The method of claim 1, wherein the clustering algorithm is a hierarchical clustering algorithm, and wherein the best deletable cluster is Pareto-optimal cluster under the metrics.

10. The method of claim 1, further comprising:
using the best deletable cluster to determine if a data object of another set of data objects is deletable or not deletable.

11. The method of claim 10, wherein another set of data objects is being stored in another computer system.

12. The method of claim 10, wherein another set of data objects belongs to the one or more users or other users.

13. The method of claim 1, wherein at least part of the combined properties are randomly selected from the set of combined properties.

14. The method of claim 1, wherein the best deletable cluster is the cluster has the highest value of the first metric and the smallest value of the second metric.

15. The method of claim 1, further comprising:
generating a set of vectors comprising the respective combined properties, wherein inputting at least part of the set of combined properties to a clustering algorithm comprises inputting at least part of the set of vectors to the clustering algorithm.

16. A computer system for estimating the deletability of a set of data objects in a computer system, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
providing data object properties of the set of data objects and user properties of users of the set of data objects, wherein the data object properties contain data object attributes that describe the data object properties, wherein the user properties contain user attributes that describe the user properties;
determining a combined property for each data object based on the data object properties and the user properties, wherein the combined property includes values for the data object attributes and values for the user attributes;
generating a multidimensional vector for each data object that represents the combined property, wherein the multidimensional vector includes a dimension for each of the data object attributes and each of the user attributes;
determining time dependent properties of the combined property for each of the data object attributes and each of the user attributes that contain a time value;
defining a first metric that indicates a deletability of a cluster of data objects, wherein the first metric is determined using the time dependent properties and a deletion variable to determine an activeness of a user based on a plurality of time dependent user attributes associated with the user;
defining a second metric that indicates the quality of the cluster, wherein the second metric is defined based on a number of property values and a number of data objects in a cluster;
using a clustering algorithm to cluster the data objects and to identify a best deletable cluster of the data objects based on observation values of the first metric and the second metric, wherein the clustering algorithm ingests the combined properties and ranks a plurality of clusters, wherein the multidimensional vectors are used as a training dataset for machine learning, wherein the best deletable cluster is identified by using a specialization criterion for learning a probabilistic deletability estimation function for the first metric and a generalization of the total number of digital objects for the second metric; and
using the best deletable cluster for determining if a data object of the set of data objects is deletable or not deletable, wherein determining if the data object of the set of data objects is deletable or not deletable includes comparing the set of data objects to the best deletable cluster by calculating the distance between the data object and a selected point of the best deletable cluster.

17. The computer system of claim 16, wherein the first metric of a given cluster is a combination of object metrics of data objects of the cluster, wherein an object metric indicates the deletability of the respective data object.

18. The computer system of claim 16, wherein the object metric of a given data object comprising a weighted sum of the activeness of users of the given data object multiplied by the activeness of the given data object, the activeness of the user is determined based on the result of comparing the current time to the start and end time associated to the user, the activeness of the given data object is determined based on the result of comparing the last modification time or creation date of the given data object to the start and end time associated to a user of the given data object.

19. A computer program product for estimating the deletability of a set of data objects in a computer system, comprising:
one or more computer-readable storage medium and program instructions stored on at least one of the one or more tangible storage medium, the program instructions executable by a processor, the program instructions comprising:
program instructions to provide data object properties of the set of data objects and user properties of users of the set of data objects, wherein the data object properties contain data object attributes that describe the data object properties, wherein the user properties contain user attributes that describe the user properties;
program instructions to determine a combined property for each data object based on the data object properties and the user properties, wherein the combined property includes values for the data object attributes and values for the user attributes;
program instructions to generate a multidimensional vector for each data object that represents the combined property, wherein the multidimensional vector includes a dimension for each of the data object attributes and each of the user attributes;
program instructions to determine time dependent properties of the combined property for each of the data object attributes and each of the user attributes that contain a time value;
program instructions to define a first metric that indicates a deletability of a cluster of data objects, wherein the first metric is determined using the time dependent properties and a deletion variable to determine an activeness of a user based on a plurality of time dependent user attributes associated with the user;
program instructions to define a second metric that indicates the quality of the cluster, wherein the second metric is defined based on a number of property values and a number of data objects in a cluster;
program instructions to use a clustering algorithm to cluster the data objects and to identify a best deletable cluster of the data objects based on observation values of the first metric and the second metric, wherein the clustering algorithm ingests the combined properties and ranks a plurality of clusters, wherein the multidimensional vectors are used as a training dataset for machine learning, wherein the best deletable cluster is identified by using a specialization criterion for learning a probabilistic deletability estimation function for the first metric and a generalization of the total number of digital objects for the second metric; and program instructions to use the best deletable cluster for determining if a data object of the set of data objects is deletable or not deletable, wherein determining if the data object of the set of data objects is deletable or not deletable includes comparing the set of data objects to the best deletable cluster by calculating the distance between the data object and a selected point of the best deletable cluster.

20. The computer program product of claim 19, wherein the first metric of a given cluster is a combination of object metrics of data objects of the cluster, wherein an object metric indicates the deletability of the respective data object.

* * * * *